United States Patent
Morrison

(10) Patent No.: US 6,727,618 B1
(45) Date of Patent: Apr. 27, 2004

(54) BEARINGLESS SWITCHED RELUCTANCE MOTOR

(75) Inventor: Carlos R. Morrison, North Ridgeville, OH (US)

(73) Assignee: The United States of America, as represented by the Administrator of National Aeronautics and Space Administration, Washington, DC (US)

(*) Notice: Subject to any disclaimer, the term of this patent is extended or adjusted under 35 U.S.C. 154(b) by 138 days.

(21) Appl. No.: 10/164,754

(22) Filed: Jun. 10, 2002

(51) Int. Cl.$^7$ .......................... H02K 7/09; H02K 19/06; H02K 1/24
(52) U.S. Cl. ...................... 310/90.5; 310/166; 310/168; 310/261; 310/267; 310/268
(58) Field of Search .................................. 310/166, 168, 310/90.5, 261, 267, 268

(56) References Cited

U.S. PATENT DOCUMENTS

| | | | |
|---|---|---|---|
| 5,880,549 A | 3/1999 | Chiba et al. | 310/168 |
| 5,909,071 A | 6/1999 | Sakuma et al. | 310/51 |
| 5,917,263 A | 6/1999 | Sakuma et al. | 310/168 |
| 5,955,811 A | 9/1999 | Chiba et al. | 310/211 |
| 5,969,454 A | 10/1999 | Pengov et al. | 310/162 |
| 6,028,385 A | 2/2000 | Pengov et al. | 310/166 |
| 6,078,119 A * | 6/2000 | Satoh et al. | 310/90.5 |
| 6,093,993 A | 7/2000 | McClelland | 310/168 |
| 6,121,709 A | 9/2000 | Fathimulla et al. | 310/216 |
| 6,177,749 B1 | 1/2001 | Hussey et al. | 310/217 |
| 6,194,805 B1 | 2/2001 | Heese et al. | 310/166 |
| 6,249,067 B1 | 6/2001 | Schob et al. | 310/68 |
| 6,465,923 B2 * | 10/2002 | Amrhein | 310/90.5 |

OTHER PUBLICATIONS

Takemoto, Chiba and Fukao, A New Control Method of Bearingless Switched Reluctance Motors Using Square-wave Currents, 2000 IEEE, pp. 375–380.

Takemoto, Shimada, Chiba, Fukao, A Design and Characteristics of Switched Reluctance type Bearingless Motors, pp. 49–63.

Takemoto, Suzuki, Chiba, Fukao, Rahman, Improved Analysis of a Bearingless Switched Reluctance Motor, IEEE Transactions on Industry Applications, vol. 37, No. 1, Jan./Feb. 2001, pp. 26–34.

Ferreira, Jones, Heglund, Jones, Detailed Design of a 30–kW Switched Reluctance Starter/generator System for a Gas Turbine Engine Application, IEEE Transactions on Industry Applications, vol. 31, No. 3, May/Jun. 1995, pp. 553–561.

Chiba, Hanazawa, Fukao, Rahman, Effects of Magnetic Saturation on Radial Force of Bearingless Synchronous Reluctance Machines, 1993 IEEE, pp. 233–239.

Takemoto, Chiba, Fukao, A Feed–Forward Compensator For Vibration Reduction Considering Matgnetic Attraction Force in Bearingless Switched Reluctance Motors, Seventh International Symposium on Magnetic Bearings, Aug. 23–25, 2000, BTH Zurich, pp. 395–400.

Miller, Faults and Unbalance Forces in the Switched Reluctance Machine, IEEE Transactions on Industry Applications, vol. 31, No. 2, Mar./Apr. 1995, pp. 319–328.

* cited by examiner

*Primary Examiner*—Burton S. Mullins
*Assistant Examiner*—David W. Scheuermann
(74) *Attorney, Agent, or Firm*—Kent N. Stone

(57) ABSTRACT

A switched reluctance motor has a stator with a first set of poles directed toward levitating a rotor horizontally within the stator. A disc shaped portion of a hybrid rotor is affected by the change in flux relative to the current provided at these levitation poles. A processor senses the position of the rotor and changes the flux to move the rotor toward center of the stator. A second set of poles of the stator are utilized to impart torque upon a second portion of the rotor. These second set of poles are driven in a traditional switched reluctance manner by the processor.

20 Claims, 1 Drawing Sheet

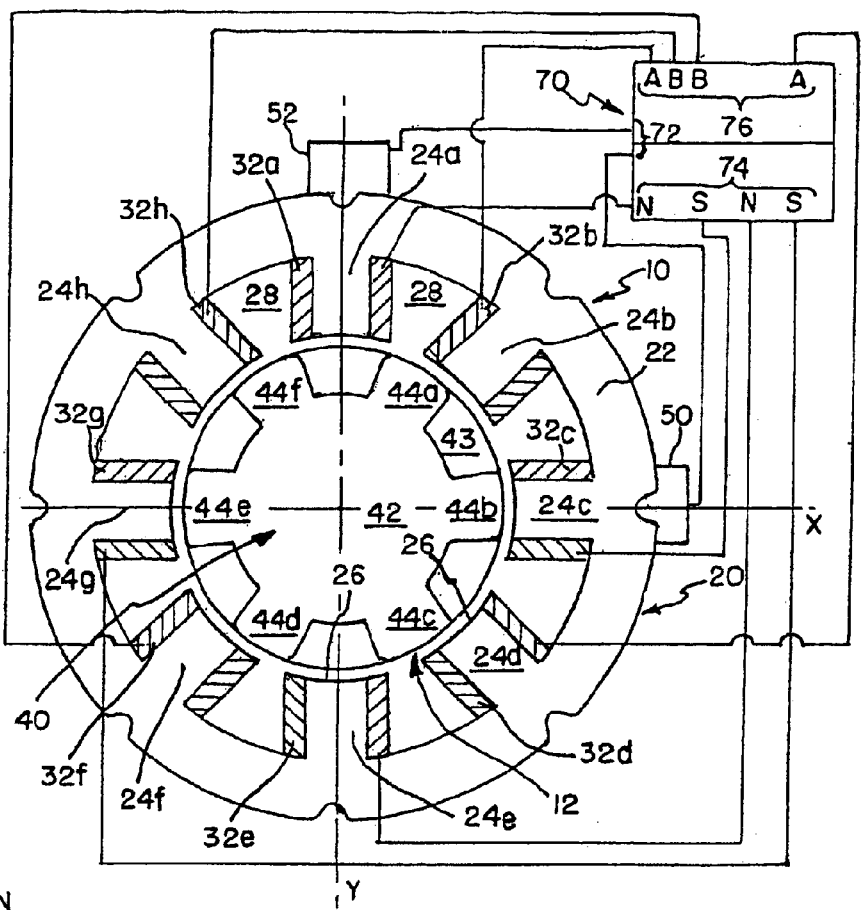
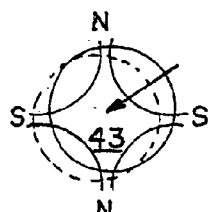
FIG.1
FIG.2
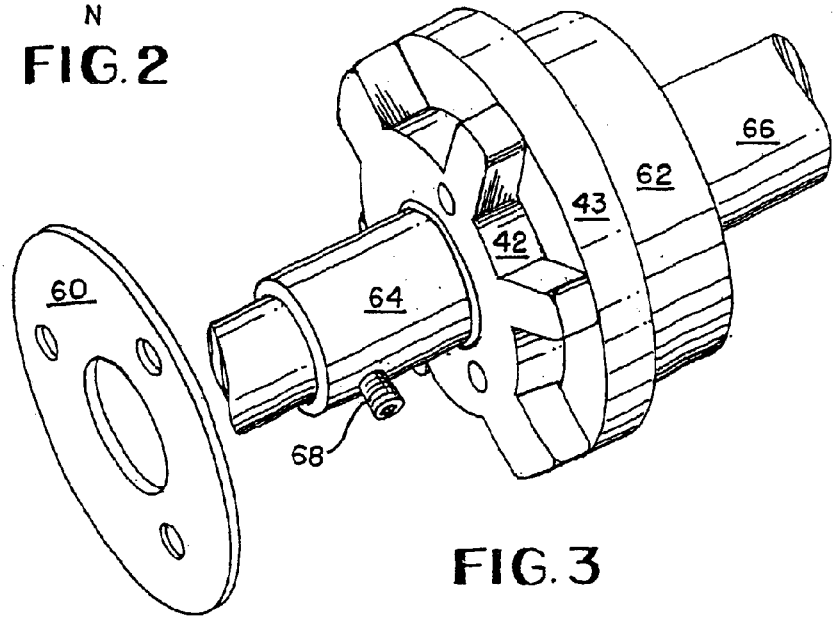
FIG.3

BEARINGLESS SWITCHED RELUCTANCE MOTOR

ORIGIN OF THE INVENTION

This invention was made by an employee of the United States Government together with government support under contract awarded by the National Aeronautics and Space Administration and may be manufactured and used by or for the Government for governmental purposes without the payment of any royalties thereon of thereof.

BACKGROUND OF THE INVENTION

1. Field of the Invention

This invention relates to switched reluctance motors, and more particularly to a bearingless switched reluctance motor.

2. Prior Art

Switched reluctance motors are typically constructed of a stator having an even number of poles, usually four or more, and a rotor having an even number of poles, also usually two or more. The poles on the rotor are typically oriented in a protruding manner crosswisely around the rotating shaft in an outward manner. The poles on the stator typically protrude inwardly with a concentrated winding thereabout in the form of a coil. The coils, which are wound on each of the pairs of opposing stator pole portions, are connected in series with each other whereby a magnetic flux is generated between each pair of opposing stator pole portions when current is supplied to the coils which are wound thereon.

In switched reluctance motors, the protruding poles of the stator attract the protruding poles on the outer peripheral surface of the rotor to generate torque and as a result, the rotor rotates. As a pole of the rotor approaches a pole of the stator, the supply current to the poles is changed, typically by means of switching elements in response to the rotational position of the rotor whereby rotatory torque is produced.

It is recognized that switched reluctance motors have advantages over reluctance, induction and permanent magnet motors due to their reliability, durability, low cost and possible operation in adverse environments including high temperatures, intense temperature variations or high rotational speeds. However, due to rotor eccentricity of rotors due to mechanical flaws during machining, conventional switched reluctance rotors suffer from vibration caused by large magnetic attraction forces on the rotor in the radial direction. Furthermore, traditional bearings are subject to wear and require lubrication.

Several patents have been obtained for improvements to switched reluctance motors including at least U.S. Pat. Nos. 5,909,071, 5,969,454, 5,880,549, 5,917,263, and 5,945,761. Few except the >549 Patent, if any, are directed to bearingless switched reluctance motors. Nevertheless at least these efforts to reduce the effects of vibration and noise in a switched reluctance motor have been made.

Bearingless switched reluctance machines, which are believed to have been achieved only in development laboratories so far, employ magnetic bearings instead of traditional bearings and are thus referred to as bearingless since there is no mechanical bearing between the rotor and the stator during operation. Of course, a mechanical bearing is usually provided should the magnetic bearing fail. By magnetically suspending the rotor relative to the stator, further efforts to suppress vibration may be employed.

U.S. Pat. No. 5,880,549 discusses a prior art switched reluctance motor construction. The rotor rotates relative to the stator while being levitated by magnetic forces. In addition to the >549 Patent, a number of papers have been authored by Akira Chiba, Masahiko Hanazawa, Ken Shimada, Tadashi Fukao, and Azizur Rahinan regarding bearingless switched reluctance machines. These individuals have studied the effects of magnetic saturation on a traditional bearingless switched reluctance motor, the mathematical formulations of forces affecting a traditional bearingless switched reluctance motor, and the addition of a feed forward compensator to adjust for the locus of magnetic centers. The studies of these individuals appear to center primarily around the use of a main four pole winding to rotate the rotor while utilizing a two pole winding to apply radial force to the winding with all of the stator poles having both windings thereon.

Accordingly, a need exists for an improved bearingless switched reluctance motor.

SUMMARY OF THE INVENTION

Consequently, it is a primary object of the present invention to provide a bearingless switched reluctance machine having higher load carrying capacity, higher stiffness and/or greater vibration suppression capacity.

It is a further object of the present invention to provide a rotor for use with a switched reluctance motor having higher load carrying capacity, higher stiffness and/or greater vibration suppression capacity.

Another object of the present invention is to utilize a single set of windings of a switched reluctance motor wherein a plurality of the poles are dedicated to levitation of the rotor while a separate plurality of poles are dedicated to rotating the rotor.

Accordingly, the present invention provides a bearingless switched reluctance motor having a stator with a plurality of pairs of poles and a hybrid rotor having a plurality of pole pairs in a laminated bundle on a first portion, and a stack of circular laminations forming a circular disc on a second portion. In the illustrated embodiment, an eight pole stator is utilized with a rotor having a first portion with six poles. Of course, other strator/rotor combinations could be utilized as well. A second portion is a disc member. Levitation may be produced and vibration may be suppressed by utilizing feed back and feed forward commands in the control software. The stator has four poles which are exclusively utilized to levitate or maintain the horizontal alignment of the rotor within the stator. The disc portions of the rotor is affected by the levitation poles of the stator. The other four poles are utilized in an opposing pair fashion to apply torque to rotate the rotor about the stator.

BRIEF DESCRIPTION OF THE DRAWINGS

The particular features and advantages of the invention as well as other objects will become apparent from the following description taken in connection with the accompanying drawings in which:

FIG. 1 is a sectional view of an 8/6 switched reluctance motor illustrating a preferred embodiment of the present invention;

FIG. 2 is a diagramic representation of magnetic flux through the levitation poles shown in FIG. 1; and FIG. 3 is a side, exploded elevational view of the rotor used in the motor of FIG. 1.

DETAILED DESCRIPTION OF THE PREFERRED EMBODIMENT

Referring to the FIG. 1, a sectional view of a motor 10 comprised of stator 20 and a hybrid rotor 40. While a motor 10 is discussed and illustrated, similar principles could be applied to a generator. Stator 20 is comprised of a stack of plate laminations 22 that are typically formed of a ferromagnetic material such as laminated silicon steel which is stamped out to salient pole form Laminations 22 are stacked face-to-face and suitably adhered to one another by means known in the art. Other materials and construction techniques for stator design may also be utilized. Stator 20 includes a plurality of like, inwardly extending stator poles 24 having inwardly facing stator pole faces 26, which are preferably concave. In the embodiment shown, the stator 20 has eight (8) stator poles, designated 24a, 24b, 24C, 24d, 24e, 24f, 24g and 24h. It is most preferred to have a number stator poles which are multiples of four, such as eight, or a twelve, the preferred embodiment of eight is illustrated. However, with other controllers, six, ten or other numbers of stator poles could also be utilized. A gap 28 is defined between adjacent stator poles 24. Stator pole faces 26 define a central bore 12 for receiving rotor 40 and may be concave in shape. The central bore 12 is substantially filled between the stator poles 24 with hybrid rotor 40 with a clearance space between the rotor 40 and stator poles 24.

The stator 20 is preferably equipped with a single set of windings, or coils. The main windings 32a, 32b, 32c, 32d, 32e, 32f, 32g and 32h are preferably divided into two sets of uses. First, four windings are utilized exclusively for levitation of the rotor 40 within the stator 20. In the preferred embodiment 32a, 32c, 32e, and 32g are not utilized to impart rotation to the rotor, but are instead, utilized to produce fluxes to support the rotor 40 within the bore 12 within the stator 20. This leaves the remaining four poles, 32b, 32d, 32f, and 32h available to drive the stator as will be explained in further detail below. This separation of motoring and bearing functions allows the controller to be very simple, hence economical. Enhanced performance, at the expense of greater complexity can be achieved by a more complex controller that would produce both motoring and bearing forces in each of the two sets of four coils.

The hybrid rotor 40 is illustrated as having a first portion 42 resembling a six pole scalloped rotor having poles 44a, 44b, 44c, 44d, 44e and 44f and a second portion 43 resembling a circular disc. Both of the first and second rotor portions 42,43 are preferably stacked laminations, however, other constructions could also be utilized. When utilized with an eight pole stator, only two pairs of opposing poles 44 of the first portion 42 and stator poles 24 may be aligned at a moment in time due to the geometric compatibility of the two configurations. In FIG. 1, stator pairs 24c, 24g are aligned respectively with rotor pairs 44b, 44e. A similar geometrical relationship exists with a 12/8 stator pole to rotor pole configuration. This is believed to be relevant to the operation of this design.

In order to rotate the hybrid rotor 40 relative to the stator 20, current is provided to the stator windings 32 in a two pole manner to draw a pair of rotor poles 44 toward the pair of stator poles 24. In the eight stator pole configuration illustrated, since four poles are dedicated to levitation, four poles, or two pairs of two are available to drive the rotor 40. In the illustrated embodiment, the drive pole pairs would be 24b, 24f along with 24d,24h.

As current is provided through stator windings 32b,32f in stator pole pair 24b,24f, a flux is created which draws the first portion 42 of hybrid rotor 40, if in the position illustrated, specifically rotor pole pair 44a,44d, toward alignment with stator pole pair 24b,24f which will rotate the hybrid rotor 40 clockwise. As the poles near alignment with one another, the current is turned off. Meanwhile, rotor pole pair 44b,44e has moved closer to stator pole pair 24d,24h which may then be energized with windings 32d,32h to pull rotor pole pair 44b,44e toward alignment with the stator pole pair 24d,24h. When alignment is near, or not past alignment, the current is turned off to windings 32d,32h to prevent reverse torque on the rotor 40. Now rotor pole pair 44f,44c will be near stator pole pair 24b,24f and the windings 32b,32f may be energized again. In this manner, the two stator pole pairs may drive the three rotor pole pairs. Current is typically provided in a square, or trapezoidal wave form or otherwise, to the stator drive windings 32b, 32d, 32f and 32h to drive the first portion 42 about the stator 20.

While the four poles 24b, 24d, 24f and 24h are driving the rotor and thus rotate a shaft 66, the other four poles 24a, 24c, 24e, and 24g are maintaining the rotor 40 in a desired position within the bore 12 within the stator 20. These are referred to as levitation poles. This is done in a manner commonly used in conventional magnetic bearings. In the illustrated embodiment, the stator poles 24a, 24e are utilized as North poles and stator poles 24c, 24g are utilized as South poles. The hybrid rotor 40 includes a circular laminate stack as a second portion 43 which is affected by the flux generated between the North and South poles. FIG. 2 is a schematic of the North and South pole arrangement of the levitation poles 24a, 24c, 24e and 24g.

Position sensors 50, 52, which can be any of several types, shown in FIG. 1, sense the x,y position of the third portion 62 of the rotor 40 and provide the data to a processor 70. The sensors 50,52 are illustrated at right angles to one another. Fortunately, the speed of modern processors allows computations to occur on the order of microseconds which allows for correcting signals to be provided to adjust the flux distribution through the North and South poles to return a rotor 40 toward its centered position relative to the stator 20.

In FIG. 2, the second portion 43 has drifted toward the three o'clock position. In operation, the sensors 50,52 would sense this change in position, the processor 70 shown in FIG. 1 would interpret the data provided by the sensors 50,52 and a correcting signal would be provided to the left South pole. Specifically, in this instance, the flux in pole 24g would be increased while the flux in pole 24c is decreased to pull the second portion 43 toward the center of the bore 12, or the second portion 43 illustrated in phantom. It is also preferable to maintain a bias flux through the North South poles as illustrated in FIG. 2 and then utilize a control current, as needed, to modify the bias flux to move the second portion 43, and thus the rotor 40 back toward center of the bore 12. Additionally, a closed loop between the sensor, to the processor, to the stator poles may be utilized. While the above description has been directed to an 8/6 stator/rotor configuration, similar logic could be applied to a 12/8 stator/rotor configuration and others.

FIG. 3 shows a side perspective and exploded view of a hybrid rotor 40. A first portion 42 is illustrated in contact with second portion 43. While the two portions 42,43 could be insulated from one another, they are in contact with one another in the preferred embodiment. Connectors may extend through bores in the portions 42,43 to locate the portions 42,43 between plate 60 and base 62. Plate 60 would be adjacent to portion 42 but has been shown in an exploded view to better illustrate the rotor portion 42. Sleeve 64 connected to plate 60 allows the portions 42,43 to be located relative to shaft 66 such as with set screw 68. While the set screw illustrated in FIG. 3 would tend to affect the balance of the rotor 40, other, more symmetric designs could be employed to allow higher speeds without significant vibra tion. The circumference of the second disc portion 43 is illustrated as extending radially at least beyond a portion of the spaces between adjacent rotor poles and preferably substantially as far as the rotor poles 44.

In the illustrated embodiment, speeds of over 5000 rpm were realized. With a more balanced mounting system about the shaft 66, speeds of over 10,000 rpm are believed to be easily attained. It can also be seen that variation in the thickness of the first and second portions 42,43 could be utilized for specific tasks: a thicker first portion 42 will enable a greater torque for a given levitation stiffness and vice versa.

Referring back to FIG. 1, a processor 70 is illustrated receiving signals from sensors 50, 52 at inputs 72 which detect movement of the rotor 40 from the center of the bore 12. Upon sensing a movement the bias current sent from outputs 74 is adjusted with a correcting current to at least one specific output 74 to attempt to pull the rotor 40 back toward center. Meanwhile outputs 76 are provided with current in a Aswitched@ manner to provide torque, and thus rotate rotor 40 about the stator 20. A feed forward compensator may be utilized as well in the processor 70. Of course, more sophisticated processors 70 could be utilized having more inputs and outputs, but the basic operation of the preferred embodiment has been found to operate satisfactorily with this construction.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A bearingless switched reluctance machine comprising:
    a stator having a plurality of inwardly directed protruding poles, four of the plurality of poles being levitation poles dedicated for use as a magnetic bearing, the remaining poles utilized as torque generating poles; and
    a rotor having a first portion with a plurality of outwardly directed poles.

2. The bearingless switched reluctance machine of claim 1 wherein the levitation poles are located at the twelve o'clock, three o'clock, six o'clock, and nine o'clock positions relative to one another about the stator.

3. The bearingless switched reluctance machine of claim 1 wherein the rotor is a hybrid rotor further comprising a second disc shaped portion.

4. The bearingless switched reluctance machine of claim 3 wherein the first portion of the rotor is scalloped shaped and the second disc shaped portion is stacked relative to the first portion to form the hybrid rotor.

5. The bearingless switched reluctance machine of claim 4 wherein the machine is a motor.

6. The bearingless switched reluctance machine of claim 4 wherein the stator has a length which is at least approximately as long as the stacked first and second portions of the hybrid rotor.

7. The bearingless switched reluctance machine of claim 1 further comprising at least two sensors detecting the position of the rotor within the stator.

8. A switched reluctance motor comprising:
    a stator having a plurality of pairs of pole portions that extend substantially in the direction of an axis of the stator and project radially inward in such a manner that each pair of pole portions are located opposite each other and define a bore therein;
    a rotor rotatably disposed within the bore of the stator, the rotor having a first portion with a plurality of pairs of projected poles that extend substantially in the direction of an axis of the rotor and that are projected radially outward so that the projected poles may face the pole portions of the stator while maintaining a clearance therefrom; and
    a plurality of coils wound around the plurality of pairs of the pole portions of the stator, a first set of the plurality of coils utilized exclusively to control a horizontal position of the axis of the rotor relative to the axis of the stator, and a second set of the plurality of coils utilized to impart torque to rotate the stator, wherein the first and second set of the plurality of coils are not located on a single pole portion.

9. The switched reluctance motor of claim 8 wherein the first set of coils are oriented on two pairs of stator poles.

10. The switched reluctance motor of claim 9 wherein the two pairs of stator poles are ninety degrees apart.

11. The switched reluctance motor of claim 8 further comprising at least two sensors sensing the position of the rotor within the stator.

12. The switched reluctance motor of claim 11 further comprising a processor in communication with the at least two sensors receiving signals therefrom.

13. The switched reluctance motor of claim 12 wherein the processor is adapted to provide control signals to at least some of the first set of the plurality of coils to move the rotor axis towards the stator axis.

14. The switched reluctance motor of claim 13 wherein the control signal, the processor, and the signal from the at least two sensors comprise a closed loop.

15. The switched reluctance motor of claim 12 wherein the processor provides a bias current to the levitation poles.

16. The switched reluctance motor of claim 11 wherein at least one sensor further comprises a first and a second sensor oriented at ninety degrees relative to one another.

17. The switched reluctance motor of claim 11 wherein the at least one sensor is a magnetic sensor and located external to the stator.

18. The switched reluctance motor of claim 8 wherein the rotor further comprises a second disc shaped portion.

19. The switched reluctance motor of claim 17 wherein the disc substantially fills the bore while maintaining a clearance from the stator poles.

20. A switched reluctance motor comprising:
    a stator having a plurality of poles portions that project inwardly toward a bore in a direction of an axis of the stator; and
    a hybrid rotor located in the bore having a first portion with projected poles extending substantially in the direction of an axis of the rotor with spaces in between adjacent poles, the first portion maintaining a clearance from the stator poles, and a second portion having a disc shape connected to the first portion, the second portion having a circumference extending radially outwardly at least as far as a portion of the spaces.

* * * * *